(12) United States Patent
Kruger et al.

(10) Patent No.: US 7,709,404 B2
(45) Date of Patent: May 4, 2010

(54) PREPREGS FOR USE IN BUILDING LAY-UPS OF COMPOSITE MATERIALS AND PROCESSES FOR THEIR PREPARATION

(75) Inventors: Stephan Kruger, Neumarkt (AT); Gerhard Entholzer, Abwinden (AT)

(73) Assignee: Hexcel Holding GmbH, Pasching (AT)

( * ) Notice: Subject to any disclaimer, the term of this patent is extended or adjusted under 35 U.S.C. 154(b) by 205 days.

(21) Appl. No.: 11/122,453

(22) Filed: May 5, 2005

(65) Prior Publication Data
US 2005/0255766 A1 Nov. 17, 2005

(30) Foreign Application Priority Data
May 11, 2004 (EP) ................... 04011176

(51) Int. Cl.
*D03D 9/00* (2006.01)
*B32B 17/04* (2006.01)

(52) U.S. Cl. .................. 442/20; 442/27; 442/38; 442/43; 442/45; 442/54; 442/58; 442/149

(58) Field of Classification Search .............. 442/20, 442/27, 38, 43, 45, 54, 58, 149
See application file for complete search history.

(56) References Cited

U.S. PATENT DOCUMENTS

| 5,104,718 A | 4/1992 | Asada et al. |
| 5,635,263 A * | 6/1997 | Saito .................. 428/40.1 |
| 2002/0192467 A1* | 12/2002 | Secrist et al. ............. 428/365 |

FOREIGN PATENT DOCUMENTS

DE 20201902 U1 8/2002

* cited by examiner

*Primary Examiner*—Ula C Ruddock
(74) *Attorney, Agent, or Firm*—W. Mark Bielawski; David J. Oldenkamp

(57) ABSTRACT

The invention concerns a process for making a scrim-reinforced prepreg for use in building low-porosity lay-ups, characterized in that a conventional prepreg is formed of a fibrous reinforcement and a heat-curable resin, the prepreg having suitable viscosity and sufficient tackiness to hold a scrim which is adhered to the prepreg by applying light pressure, so that the scrim is impressed onto the prepreg to such a degree, that less than half of the circumference of the scrim strands becomes coated by the prepreg-resin.

10 Claims, 3 Drawing Sheets

Graph 1

PREPREGS FOR USE IN BUILDING LAY-UPS OF COMPOSITE MATERIALS AND PROCESSES FOR THEIR PREPARATION

BACKGROUND OF THE INVENTION

1. Field of the Invention

The present invention relates to composite materials and in particular to prepregs which can be used in building composite materials of lay-ups of such prepregs which are pressmolded and cured.

2. Description of Related Art

The use of composite materials, in particular reinforced thermosetting composites, is continually increasing; a new application of such material is for windmill blades in wind energy plants.

Prepregs have been known and used for this purpose, which are composed of heat-curable resins and fibers and may also comprise a coarse net of reinforcing rovings. Such prepregs are sold to the customer who can form composite materials of different shapes by building up lay-ups of such prepregs, for instance 50 and more prepreg layers, and press molding and heating these lay-ups to obtain the appropriate shape and cure the resin.

In highly stressed components the void content of such laminates is significant for the performance and therefore for dimensioning such parts, as each void is a point of defect which decreases the mechanical properties. For this reason the customer requires prepregs which produce a low, reproducible void content, but which at the same time have good handling properties.

Since air tends to be captured between several layers of prepregs, it has been customary to process the lay-up of the prepregs under vacuum. It has also been known to intermittently interpose dry, air-permeable layers of for instance resin-free webs between the resin layers to allow the air to escape through these dry layers when putting on vacuum. This technique is rather troublesome and does not yield reproducible results, since in the heating step the resin penetrates the air-permeable layer irregularly. A technique of this kind is described in DE 202 01 902 U1, whereby the prepreg is combined with a web which over its thickness is only partially impregnated. It is difficult to fix such a thick web to the prepreg without applying a further resin layer at the top, possibly together with another fixing element, otherwise there will be loose filaments at the outer side of the prepreg, which would impair the handling properties.

SUMMARY OF THE INVENTION

The inventors now have found a simple but very efficient way to allow the air to escape during the press-molding step using a scrim or veil like material as a means to provide air escape paths. Surprisingly, a reduction in laminate void levels and hence improved mechanical properties were found. A thermoplastic scrim or veil is the preferred material although alternatives such as glass or natural fiber scrim, fabric or fleeces are also suitable. Grid weights of 60 gsm or lower are desirable.

DETAILED DESCRIPTION OF THE INVENTION

Figure 4:
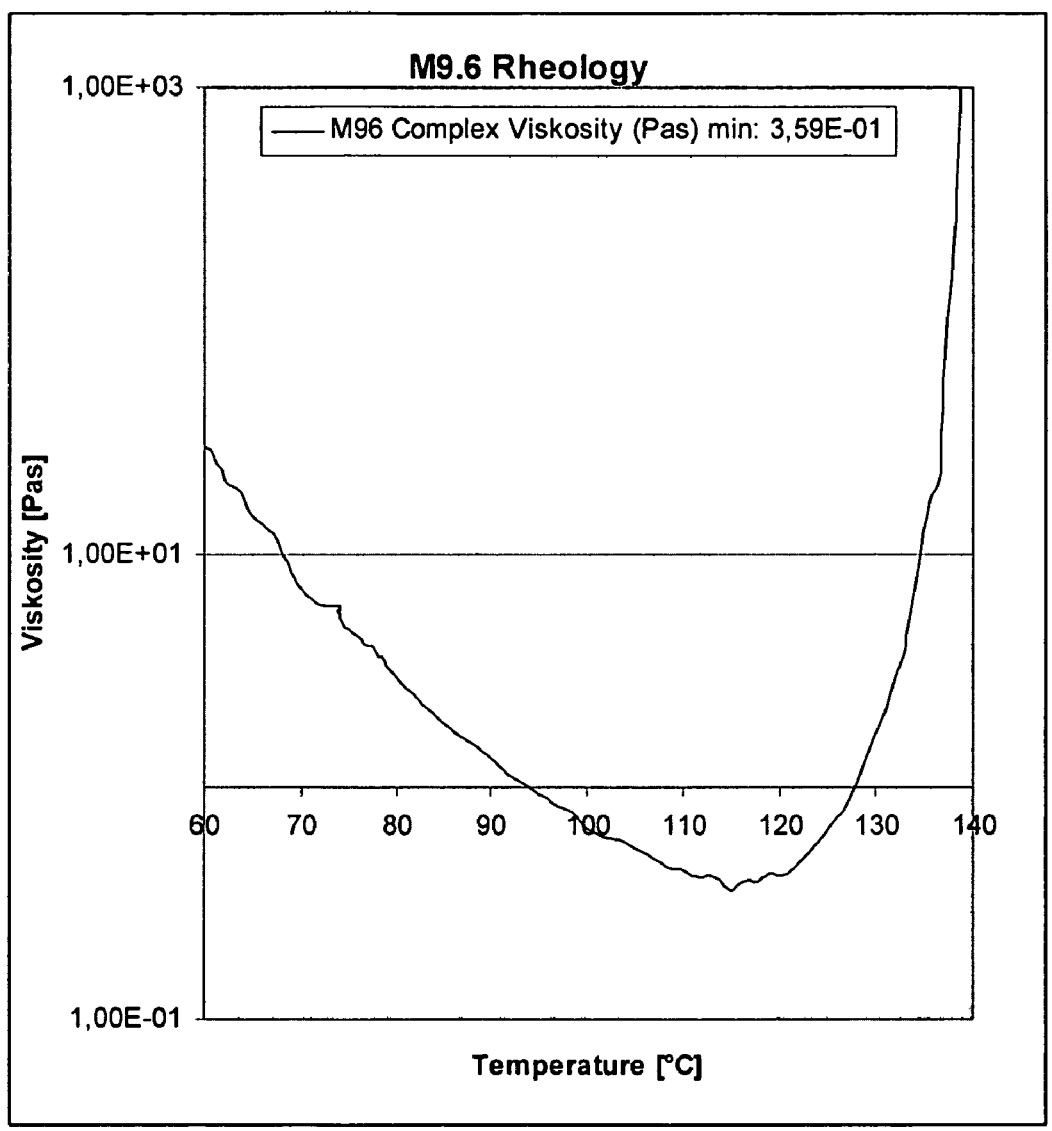
FIG. 4 is a graph of a typical viscosity profile of resins in accordance with the present invention.

In its general form the invention therefore provides a process for making a scrim-reinforced prepreg for use in building low-porosity lay-ups, whereby a conventional prepreg is formed of a reinforcement and a heat-curable resin, the prepreg having suitable viscosity and sufficient tackiness to hold a scrim which is adhered to the prepreg by applying only light pressure, so that the scrim is impressed onto the prepreg to such a degree, that less than half, preferably less than 30% and more preferably less than 25% of the circumference of the scrim strands become coated by the prepreg resin i.e. the scrim is primarily on the surface of the prepreg web. A typical viscosity profile for such a resin is shown in graph 1 (FIG. 4). Tack, which is a measure of the adhesion of a prepreg ply to the tool surfaces or to other prepreg plies in the assembly, is an adhesion characteristic of the matrix resin that is controlled in order to facilitate ply cutting and lay-up operations. The plies should be capable of being removed and repositioned if necessary. For the purpose of this invention, a suitable tack level is one that allows two prepreg plies to stick together when one is placed, by hand, on top of the other on a flat surface and, also allows the two plies to be subsequently separated by light hand pressure.

This procedure leaves more than the upper half of the scrim strands uncoated with the resin, so that when the next prepreg is put on top of the scrim of the lower prepreg, channels are formed along the strands of the scrim, through which the air can escape when the vacuum is applied during further processing and before these channels are closed by the molding pressure.

The light pressure to be applied in order to impress the scrim onto the prepreg to the required degree can be easily and efficiently obtained by simply laminating the scrim to the prepreg during the wind-up step on the prepreg machine. There is adequate tension in the wound-up roll to complete the partial impregnation into the prepreg. Such techniques are well known to those skilled in the art.

Suitable heat-curable resins for the preparation of the prepreg are selected. The heat-settable resin mixtures of the present invention include a resin component and a curing agent component. The resin component includes one or more thermosetting resins. Exemplary resins include epoxy, cyanate ester, polyester, vinyl ester and bismaleimide resins. Exemplary epoxy and cyanate ester resins include: glycidylamine type epoxy resins, such as triglycidyl-p-aminophenol, tetraglycidyldiaminodiphenyl-methane; glycidyl ether type epoxy resins, such as bisphenol A type epoxy resins, bisphenol F type epoxy resins, bisphenol S type epoxy resins, phenol novolak type epoxy resins, cresol novolak type epoxy resins and resorcinol type epoxy resins; and cyanate esters, such as 1,1'-bis(4-cyanatophenyl)ethane (e.g. AroCy L-10, available from Vantico, Inc., Brewster, N.Y.), 1,3-Bis (4-cyanateophenyl-1-1-(1-methylethylidene) benzene (e.g. RTX366, available from Vantico, Inc., Brewster, N.Y.).

Epoxy resins are preferred. The epoxy may be composed of trifunctional epoxy, difunctional epoxy and a wide variety of combinations of trifunctional and difunctional epoxies. Tetrafunctional epoxies may also be used as can aliphatic and alicyclic epoxies. Exemplary trifunctional epoxy include triglycidyl p-aminophenol and N,N-Diglycidyl-4-glycidyloxyaniline (MY-0510 or MY-0500 available from Vantico, Inc., Brewster, N.Y.). Exemplary difunctional epoxies which may be used in the resin include Bis-F epoxies, such as GY-281, LY-9703 and GY-285 which are available from Vantico, Inc., Brewster, N.Y.). Bis-A epoxies, such as GY-6010 (Vantico, Inc., Brewster, N.Y.), Epon 828 (Resolution Performance Products) and DER 331-(Dow Chemical, Midland, Mich.) are suitable Bisphenol-A type epoxies and may also be used. An exemplary tetrafunctional epoxy is tetraglycidyl diaminodiphenyl methane (MY-721, MY-720 and MY-9512 available from Vantico, Inc., Brewster, N.Y.). Preferred bis-F epoxies include GY281 and GY285 which are available from Vantico, Inc., Brewster, N.Y. Other commercially available epoxies that have been used in making composite materials are also suitable.

The curing agent component can include any of the known curing agents for theromoset curing of resins. The curing agents may be used alone or in combination as is well known. Suitable curing agents include: anhydrides; Lewis acids, such as BF3; amines such as dicyandiamide; 3,3-diamino-diphenylsulfone (3,3-DDS); amino or glycidyl-silanes such as 3-amino propyltriethoxysilane; CuAcAc/Nonylphenol (1/0.1); 4,4'-diaminodiphenylsulfone (4,4'-DDS); 4,4'-methylenebis(2-isopropyl-6-methylaniline), e.g., Lonzacure M-MIPA (Lonza Corporation, Fair Lawn, N.J.); 4,4'-methylenebis(2,6-diisopropylaniline), e.g., Lonzacure M-DIPA (Lonza Corp., Fair Lawn, N.J. Substituted ureas or imidazoles may also be useful as curatives.

The curing temperature of the curable resin mixture will depend upon the particular curing agents and resins being used and the relative amounts of each. In general, the resin(s) and curing agent(s) will be selected so that the curing temperature will be less than 200° C. A preferred cure temperature range is between 75-120° C.

Further minor ingredients may be included as performance enhancing or modifying agents in the matrix resin composition, such as any of the following: accelerators; thermoplastics and core shell rubbers; flame retardants; wetting agents; pigments/dyes; UV absorbers; anti-fungal compounds; fillers; toughening particles and viscosity modifiers.

The reinforcing fibers may be synthetic or natural fibers or any other form of material or combination of materials that, combined with the resin composition of the invention, forms a composite product. The reinforcement web can either be provided via spools of fiber that are unwound or from a roll of textile. Exemplary fibers include glass, carbon, graphite, boron, ceramic and aramid. Preferred fibers are carbon and glass fibers. Hybrid or mixed fiber systems may also be envisaged. The use of cracked (i.e. stretch-broken) or selectively discontinuous fibers may be advantageous to facilitate lay-up of the product according to the invention and improve its capability of being shaped. Although a unidirectional fiber alignment is preferable, other forms may also be used. Typical textile forms include simple textile fabrics, knit fabrics, twill fabrics and satin weaves. It is also possible to envisage using non-woven or non-crimped fiber layers. The surface mass of fibers within the fibrous reinforcement is generally 80-4000 g/m$^2$, preferably 100-2500 g/m$^2$, and especially preferably 150-2000 g/m$^2$. The number of carbon filaments per tow can vary from 3000 to 320,000, again preferably from 6,000 to 160,000 and most preferably from 12,000 to 48,000. For fiberglass reinforcements, fibers of 600-2400 tex are particularly adapted.

The thickness of the fibrous filaments may range from 10-100 microns.

The resin content in the prepreg is of some importance and preferably should be between 25 and 45 weight %, most preferably 29 to 35 weight %. The resin content is also dependent on the fibrous material in the prepreg. Usually glass fibers require a lower resin content than carbon fibers. With glass fibers a preferred resin content is between 25 and 38 weight % and with carbon fibers between 27 and 42 weight %.

Although the resin viscosity range can be rather broad, in general, the viscosity of the resin is between $5 \times 10^3$ to $5 \times 10^5$ Pas sec. at ambient temperatures of 20-25° C.

The wide-meshed scrim or grid may be made of any suitable material, but thermoplastic yarns are preferred. The key requirement of the yarn material is that it has a melting point similar to or higher than the prepreg gelling temperature so that the scrim yarns do not melt during the curing process. Preferably, the difference between yarn melt point and the matrix gelling point should be at least 10° C. Suitable materials for the scrim include polyester (76-1100 dtex) such as polyethylene terephthalate and polybutylene terephalate and copolymers thereof, polyamide (110-700 dtex) such as nylon 6, nylon 66, nylon 10, nylon 11 and nylon 12, polyethersulphone, polypropylene, viscose staple yarn (143-1000 dtex), meta and para-aramid (Kevlar® 29 220-1100 dtex and Nomex T-430 220-1300 dtex, glass 220-1360 dtex), jute (2000 dtex), flax (250-500 dtex), cotton (200-500 dtex) and combinations of one or more of these. Such material is available under the Bafatex tradename from Bellingroth GmbH, Wipperfuerth, Germany.

The strands which form the scrim preferably have a substantially round cross-section. The diameter of these strands preferably may be 100 to 1000 μm, preferably 200 to 600 and more preferably 300 to 400 μm. If the scrim fiber diameters are too large, then mechanical properties of the cured laminate may be adversely affected. For example, both interlaminar shear strength and compression strength were found to decrease.

The essential feature of the invention is that the strands of the scrim are not fully impregnated by the resin of the prepreg. The degree by which the strands of the scrim are coated with resin can be expressed by the degree of impregnation (DI). The DI indicates to which degree the circumference of the scrim strands are covered with resin. Therefore, an impregnation index of 1.0 means that the strands are fully impregnated by the resin and an impregnation index of 0.5 indicates, that half of the circumference of the grid strands is coated by the resin. The invention requires that the scrim strands are covered with the prepreg resin to a minimum degree, just sufficient in order that the scrim will adhere to the prepreg to assure safe handling. It must not be covered by the resin, however, to 50% of the circumference of the strands or more, to assure the proper provision of air escape channels. Therefore, expressed as a "degree of impregnation", the invention requires that the degree of impregnation is between >0 and <0.5 and preferably between 0.2 and 0.3.

To assure that the outward ends of the air channels provided along the scrim strands do not become clogged by the prepreg resin, the scrim should extend outwardly beyond the edges of the prepreg. Preferably the scrim should jut out over the edges of the prepreg by 2 to 30, in particular by 10 to 20 mm.

A polyethylene or silicone coated release paper may be placed as a protector layer on one or both sides of the prepreg-scrim assembly.

The manufacture of the prepregs is usually done by way of running sheets wound up on rolls although supply of cut sheets is also possible. The width of the material can be between 10 and 2000 mm, preferably between 200 and 1100 mm. Lengths of several hundreds of meters are conventional.

The structure of the scrim is of importance and consists of two main elements. In the 0° or warp direction, the yarns are used to primarily stabilize those yarns that are aligned in other directions even when under tension in a wound-up roll. Other yarns, that run in a crosswise direction to the warp yarns form parallelograms. In general the grid forms a coarse net in which the parallel strands of the parallelogram have a distance of 3 to 60, preferably 10 to 35 and most preferably 20 to 30 mm from each other.

For the escape of the air the short channels to the lateral edges of the prepreg formed by the strands in roughly cross-direction are of importance. Preferably the scrim should include parallelograms with side lengths of 10 to 35 mm, wherein the smaller angle of the parallelogram is between 50 and 80, preferably between 65 and 75°. Therefore the scrim preferably should comprise strands in longitudinal direction, which is the running direction of the sheet, and strands in roughly cross-direction to the running direction of the sheet. With such a scrim construction during the pressmolding of the prepreg lay-ups, also advancing in longitudinal direction, the air will first advance along the longitudinal strands up to a point, where the longitudinal strand meets a strand in cross-direction, from where the air will escape outwardly along a strand in cross-direction. These strands in cross-direction create a short way outwardly. In this connection, also the angle between the strands in longitudinal direction and the strands in roughly cross-direction is of practical importance.

In a preferred embodiment the prepregs consist of 65 to 71 parts by weight of unidirectionally aligned carbon fibers fully impregnated with 29 to 35 parts by weight of a thermosettable resin, to which prepreg there is impressed a scrim consisting of a) longitudinal i.e. warp strands having a distance from each other of 3 to 12 mm and b) strands in roughly cross-direction forming parallelograms with a smaller angle of 65 to 75 degrees and a side length of 10 to 35 mm, the strands having a substantially round cross-section and a diameter of 200 to 600 µm, whereby the strands of the scrim are impressed into the prepreg to such a degree, that 2 to 40% of their circumference are impregnated with the resin of the prepreg, and whereby 10 to 20 mm of the grid jut out over the lateral edges of the prepreg.

The prepregs according to the invention are particularly useful for the manufacture of low-porosity lay-ups for windmill blades.

Comparative Experiments

The advantages of the invention are demonstrated by the following four comparative experiments, in which the result of experiment C according to the invention is compared with the result of experiments A, B and D according to the prior art.

Experiment A

Alternate plies of carbon prepregs with a resin content of 40% and 24% by weight, each with 150 g/m² carbon UD fibers were put one on top of the other (50 layers of each kind of prepreg, in total therefore 100 layers) to form a lay-up. The matrix resin type was M9.6 available from Hexcel, Pasching, Austria and the fiber type was T600S available from Soficar, Abidos, France. This lay-up was subsequently pre-compacted and cured under vacuum, then cut and tested for the presence of air voids. A two-step cure cycle was used in which the temperature was slowly increased to 85° C. over 2 hours 15 minutes and then held at 85° C. for a further 1.5 hours. This was followed by a further temperature ramp to 120° C. over 1.5 hours with a second temperature hold at 120° C. for 1 hour. Cooling to 90° C. and preferably to below 60° C. is desirable before removing the cured laminate from the mold.

Experiment B

Experiment A was repeated with the only difference that 50 layers of carbon prepregs with a resin content of 33% by weight and a content of 300 g/m² carbon UD fibers were put one on top of the other.

Experiment C

A lay-up was formed of 100 carbon prepreg layers exactly like in experiment A with the only difference that a polyester scrim was attached to each prepreg when the lay-up was formed from the prepregs. This polyester grid had a construction of 160 yarns per 100 cm in 0° direction with the diagonal yarns having an angle of 70° and a separation of 25 mm. The scrim was impressed on the prepreg such that a degree of impregnation of 0.2 to 0.4 was obtained.

Experiment D

A prepreg was prepared consisting of the same polyester scrim as used in experiment C, carbon UD fibers in an amount of 500 g/m² and 32% by weight of the same resin. Scrim and fibers were fully impregnated with the resin. With this prepreg material a lay-up of 50 layers was formed and cured and tested as in experiments A to C.

Results

Cured laminates from the above experiments were sectioned through the thickness, the surfaces finely ground and visual observations made on the void content. Experiments A and B resulted in a low amount of air voids in the cured lay-up. Experiment C resulted in a laminate which was practically free of air voids. In the laminate of the experiment D numerous and large air voids had been visible.

Figure 1:
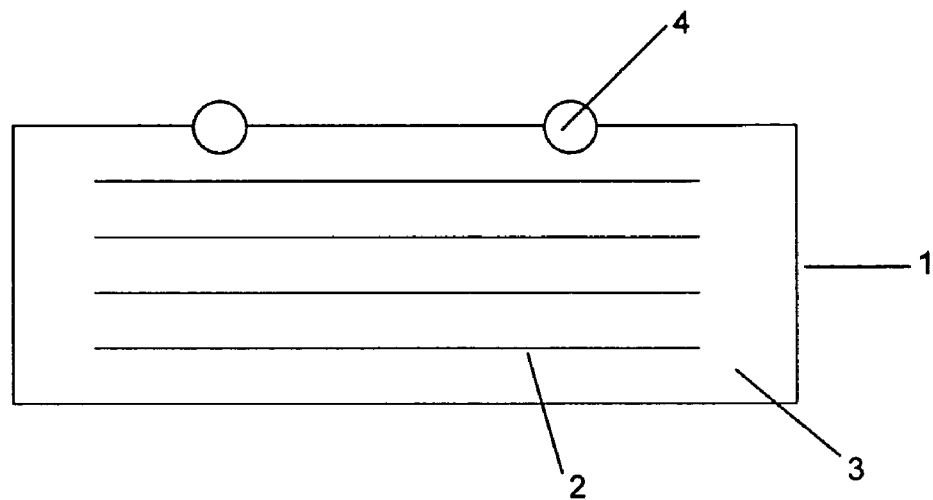
FIG. 1 is a cross section view of an exemplary embodiment of the present invention.
Figure 2:
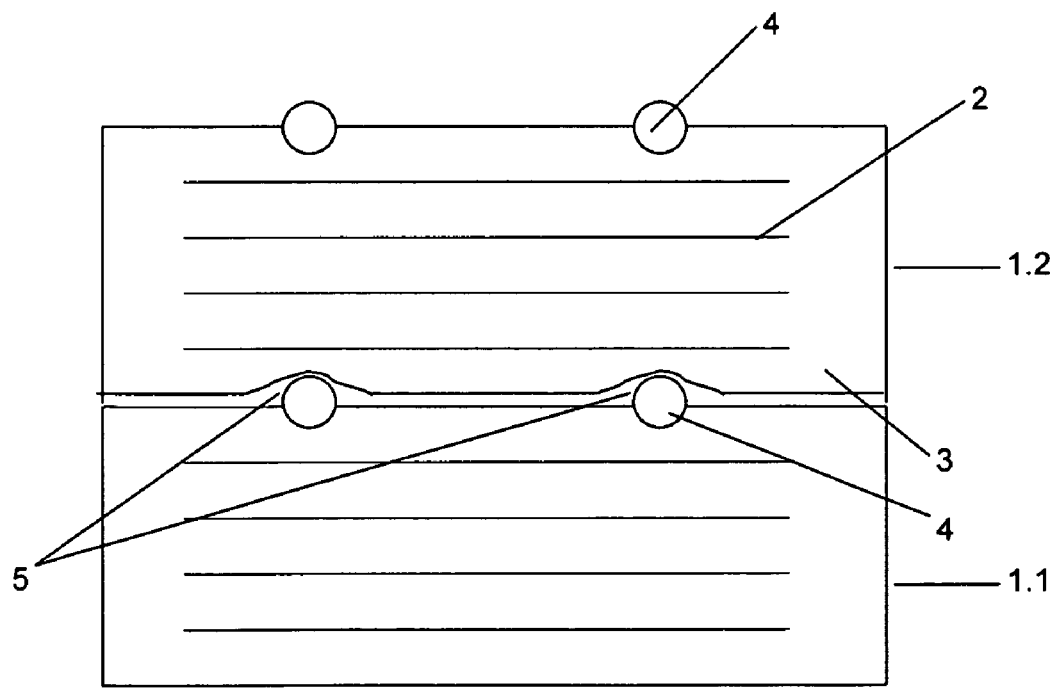
FIG. 2 is a cross section view of another exemplary embodiment of the present invention.
Figure 3:
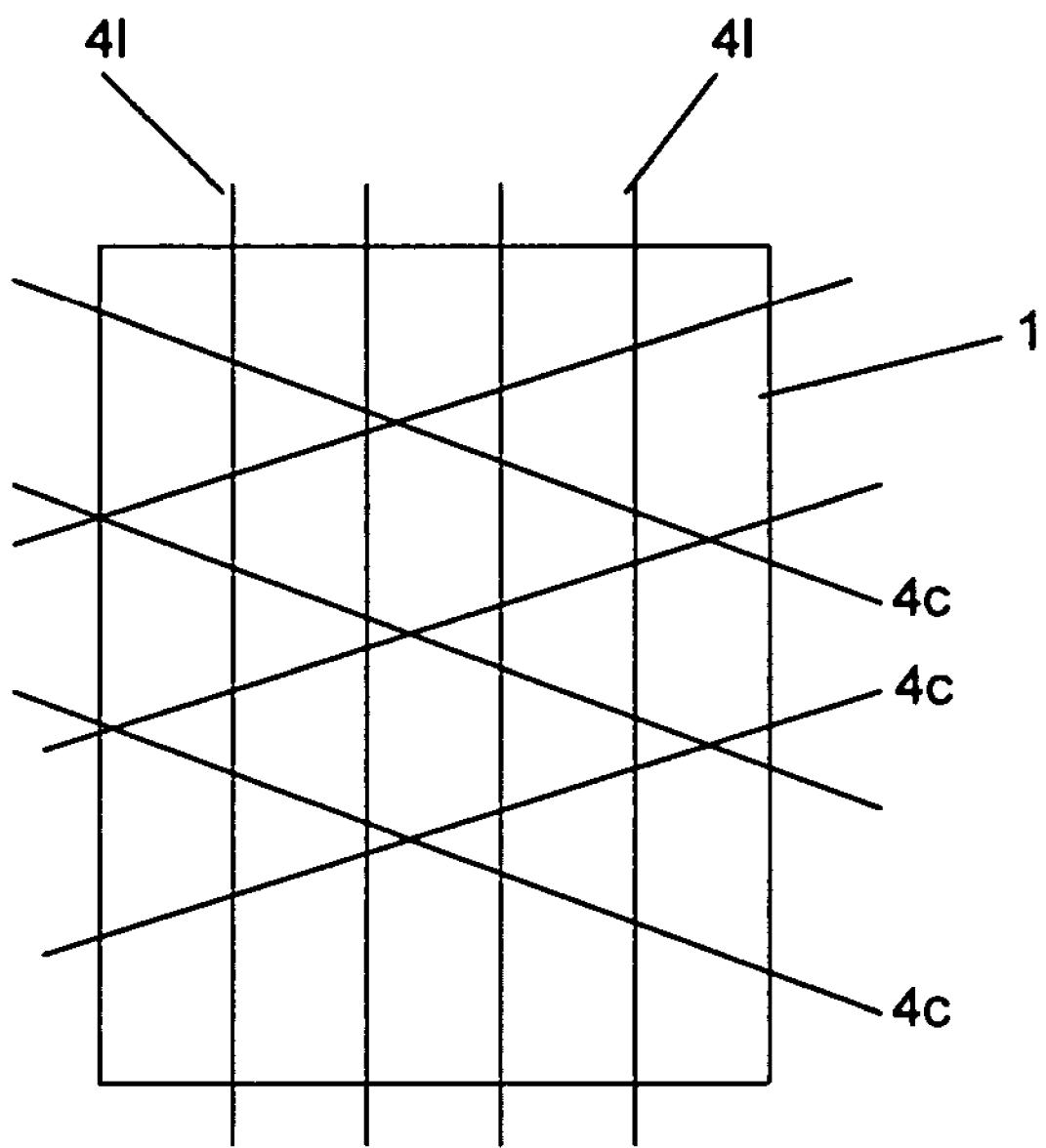
FIG. 3 is a top view of an exemplary embodiment in which the strands extend over the edge of the prepreg.

The invention is further demonstrated by the attached FIGS. 1 to 3.

FIG. 1 shows a cross-section of a prepreg (1) consisting of unidirectionally aligned fibers (2) and resin (3). Impressed on this prepreg is a scrim consisting of strands (4).

FIG. 2 shows a prepreg (1.1) identical with the prepreg shown in FIG. 1, on the top of which there is a second prepreg (1.2) of the same kind, whereby already some pressure had been applied, so that the air channels (5) at the sides of the scrim strands (4) become visible.

FIG. 3 shows the construction of a scrim consisting of longitudinal strands (4*l*) and strands in roughly cross-direction (4*c*), these strands extending over the edges of the prepreg (1).

What is claimed is:

1. A scrim-reinforced prepreg for use in building low-porosity lay-ups comprising:
   a first prepreg ply comprising a fibrous reinforcement located in a heat-curable resin matrix, said first prepreg ply having a surface;
   a second prepreg ply comprising a fibrous reinforcement located in a heat-curable resin matrix, said second prepreg ply having a surface;
   a scrim located between said first prepreg ply and said second prepreg ply, said scrim comprising a plurality of strands that form a grid of parallelograms comprising warp direction strands and strands that are crosswise to said warp direction strands wherein the surfaces of said first and second prepreg plies are pressed against said scrim so as to provide air escape channels that are located between the surfaces of said first and second prepreg plies and along said plurality of strands to form a grid of channels through which air can escape from said scrim-reinforced prepreg.

2. A scrim-reinforced prepreg according to claim 1 wherein said fibrous reinforcement comprises fibers selected from the group consisting of glass fibers, carbon fibers, graphite fibers, boron fibers, ceramic fibers and aramid fibers.

3. A scrim-reinforced prepreg according to claim 2 wherein said fibers are unidirectionally aligned.

4. A scrim-reinforced prepreg according to claim 1 wherein said heat-curable resin matrix comprises a thermosetting resin.

5. A scrim-reinforced prepreg according to claim 1 wherein said scrim comprises strands that have a substantially round cross-section.

6. A scrim-reinforced prepreg according to claim 1 wherein said first and second prepreg plies comprise an edge and wherein said scrim extends outwardly beyond said edge.

7. A scrim-reinforced prepreg according to claim 1 wherein said scrim comprises strands that are thermoplastic.

8. A scrim-reinforced prepreg according to claim 1 wherein said scrim comprises strands selected from the group consisting of polyester strands, polyamide strands, polyethersulphone strands, polypropylene strands, viscose staple yarn, meta-aramid strands, para-aramid strands, jute strands, flax strands and cotton strands.

9. A scrim-reinforced prepreg according to claim 1 wherein the parallel strands of said parallelograms are from 3 to 60 millimeters from each other.

10. A scrim-reinforced prepreg according to claim 1 wherein said first and second prepreg plies have a tack level such that said first and second prepreg plies stick to each other when said first prepreg ply is placed on top of said second prepreg ply and wherein said first and second prepreg plies can be subsequently separated from each other.

* * * * *